United States Patent [19]

Lee, Jr.

[11] Patent Number: 4,512,280
[45] Date of Patent: Apr. 23, 1985

[54] PIPE CONVEYING APPARATUS

[76] Inventor: Roy Lee, Jr., 10134 Briar Dr., Houston, Tex. 77042

[21] Appl. No.: 435,726

[22] Filed: Oct. 21, 1982

Related U.S. Application Data

[63] Continuation-in-part of Ser. No. 267,994, May 28, 1981, abandoned.

[51] Int. Cl.$^3$ ............................................. B05C 3/09
[52] U.S. Cl. ........................... 118/426; 118/DIG. 12; 198/774; 198/435; 198/592
[58] Field of Search ............... 198/774, 776, 342, 631, 198/435, 592, 955; 134/166 C, 170; 118/426, DIG. 12

[56] References Cited

U.S. PATENT DOCUMENTS

| | | | |
|---|---|---|---|
| 3,101,475 | 8/1963 | Peterson et al. | 198/369 |
| 3,130,830 | 4/1964 | Allbeson | 198/774 |
| 3,729,086 | 4/1973 | Phillips et al. | 198/774 |
| 4,071,137 | 1/1978 | Fink | 198/955 X |
| 4,147,503 | 4/1979 | Herchenbach et al. | 198/774 X |
| 4,321,995 | 3/1982 | Dell et al. | 198/774 X |

Primary Examiner—Joseph E. Valenza
Assistant Examiner—Dennis Williamson
Attorney, Agent, or Firm—Vaden, Eickenroht, Thompson & Jamison

[57] ABSTRACT

Pipe conveying apparatus is disclosed that moves pipe in steps in a direction perpendicular to the longitudinal axis of the pipe. The apparatus includes a plurality of spaced, parallel, fixed rails that have notches on their upper surface that are transversely aligned in rows. Each pipe joint extends across the fixed rails and engages a row of notches which hold the pipe joint from lateral movement along the rails. A plurality of movable rails are located parallel to the fixed rails. The movable rails also have notches on their upper surface that are transversely aligned in rows for supporting the pipe. The rows of notches on the movable rails are positioned to move the pipe joints resting at the bottom of the rows of notches on the fixed rail to the next adjacent row of notches when the movable rails are moved upwardly transferring the pipe to the movable rails where the notches are located to cause the pipe to move along the rails into position to be transferred to the next row of notches on the fixed rail when the movable rails are moved downwardly transferring the pipe back to the fixed rails. One section of the apparatus tilts the pipe to dip the ends of the pipe into a series of chemical baths to inhibit rust on the newly machined threads. A special design of the apparatus is used to transfer the pipe from the conveyor to a pipe storage rack at the desired height for the storage rack.

4 Claims, 12 Drawing Figures

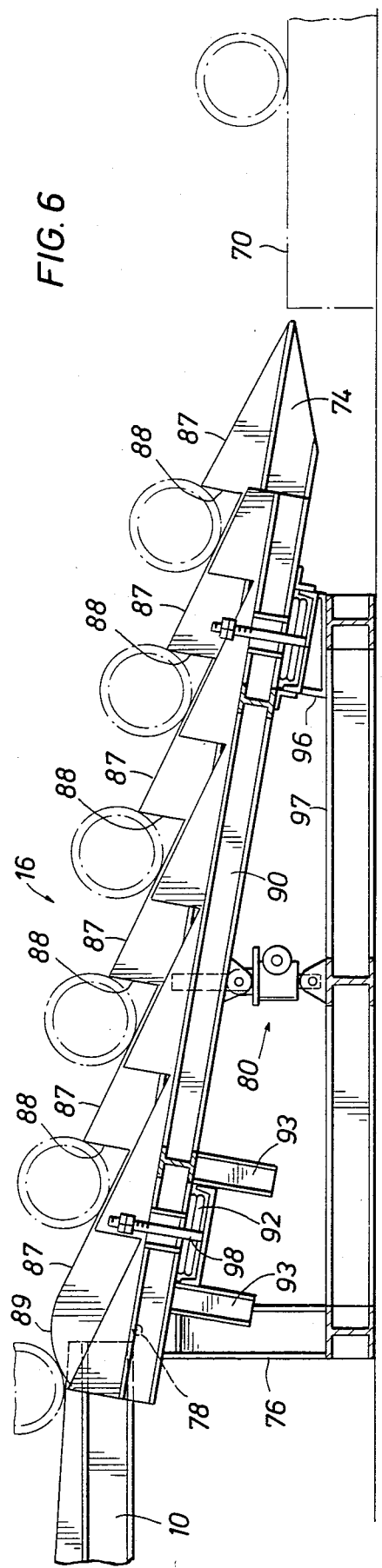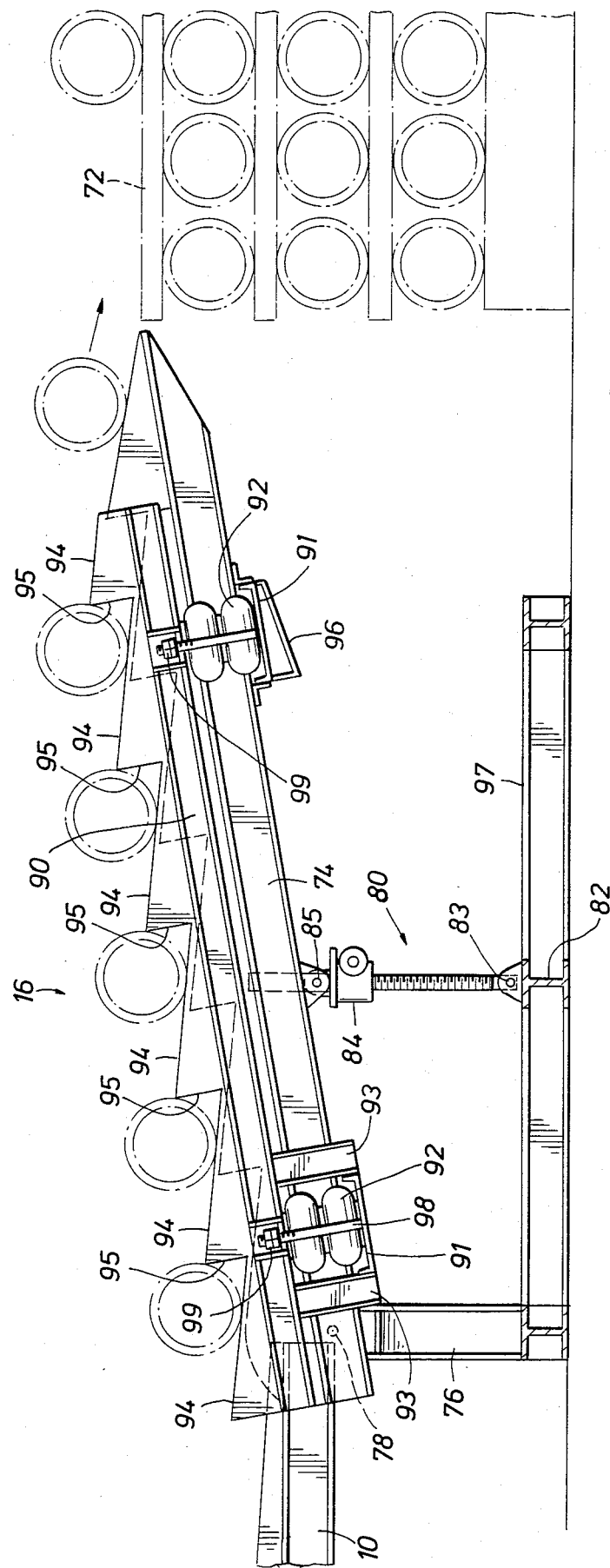

PIPE CONVEYING APPARATUS

This application is a continuation-in-part of Ser. No. 267,994, filed 5-28-81, now abandoned.

This invention relates to pipe conveying apparatus generally. In one aspect, the invention relates to apparatus for moving pipe in steps in a direction perpendicular to its longitudinal axis. In another aspect, the invention relates to apparatus for moving pipe from a conveyor to a pipe storage rack. In yet another aspect, the invention relates to apparatus for dipping the ends of the pipe being moved along the conveyor of this invention into tanks containing liquids baths to clean, coat, and rinse the ends of the pipe.

This invention has utility wherever it is desirable to move pipe horizontally and it is particularly useful for moving pipe through a pipe threading plant, a pipe coating plant, or a pipe inspecting plant. In these operations, the pipe moves through a series of work stations in a direction perpendicular to its longitudinal axis. In a pipe inspection plant, for example, the pipe will move through approximately fourteen work stations. In a pipe coating plant, there are a number of stations where the pipe is stopped and operations performed thereon and also ovens through which the pipe is moved at a preselected rate.

It is an object of this invention to provide pipe conveying apparatus that will move pipe through a plant in an orderly step-by-step manner.

It is a further object of this invention to provide apparatus that will move pipe along parallel pipe supporting rails along a line perpendicular to longitudinal axis of the pipe by causing the pipe to roll down adjacent relatively short inclined surfaces on the pipe supporting rails due to gravity, so that the pipe is moved in short steps to prevent the damage that often results when the pipe is allowed to roll down long inclined pipe rails where it can gain substantial momentum before striking the pipe already at rest on the lower end of the rails.

It is a further object of this invention to provide pipe conveying apparatus that includes an adjustable section at the end of the conveyor that will transfer the pipe leaving the plant to pipe storage racks at the desired level to minimize the chance of damage to the pipe as it is moved from the plant to storage.

It is a further object of this invention to provide pipe conveying apparatus that has a section that pivots around an axis parallel to the direction of travel of the pipe to dip the ends of the pipe sequentially into tanks containing liquids to chemically treat the pipe as the pipe moves through this section of the apparatus.

It is a further object of this invention to provide pipe conveying apparatus that includes a plurality of spaced, parallel, fixed pipe rails along side of which are located a plurality of parallel movable pipe rails with both the movable rails and the fixed rails having notches along their upper surface with the notches positioned on the rails for the movement of the pipe from notch to notch on the fixed rail by raising the movable rails to pick up the pipe from the fixed rails and lowering the movable rails to transfer the pipe back to the fixed rails.

These and other objects, advantages, and features of this invention will be apparent to those skilled in the art from a consideration of this specification, including the attached drawings and appended claims.

IN THE DRAWINGS

FIG. 6 is a side view, in elevation, of the pipe stacking apparatus at the end of the pipe conveying apparatus in position to transfer the pipe to the pipe storage rack at its lowest level;

FIG. 7 is a view similar to FIG. 6 showing the pipe stacker in position to transfer pipe from the conveying apparatus to the pipe storage rack when the pipe storage rack already has three rows of pipe stacked on it;

The pipe conveying apparatus of this invention includes a plurality of spaced, parallel, fixed rails and a plurality of movable rails that are parallel to each other and to the fixed rails. Both the fixed and movable rails are provided with notches along their upper surfaces in the bottom of which the pipe comes to rest when the pipe is supported by the rail. The notches are designed and positioned on the rails so that an upward and then downward movement of the movable rail will move a pipe joint from one notch to the adjacent notch on the fixed rail. How this is accomplished will be discussed in detail below.

Figure 1:
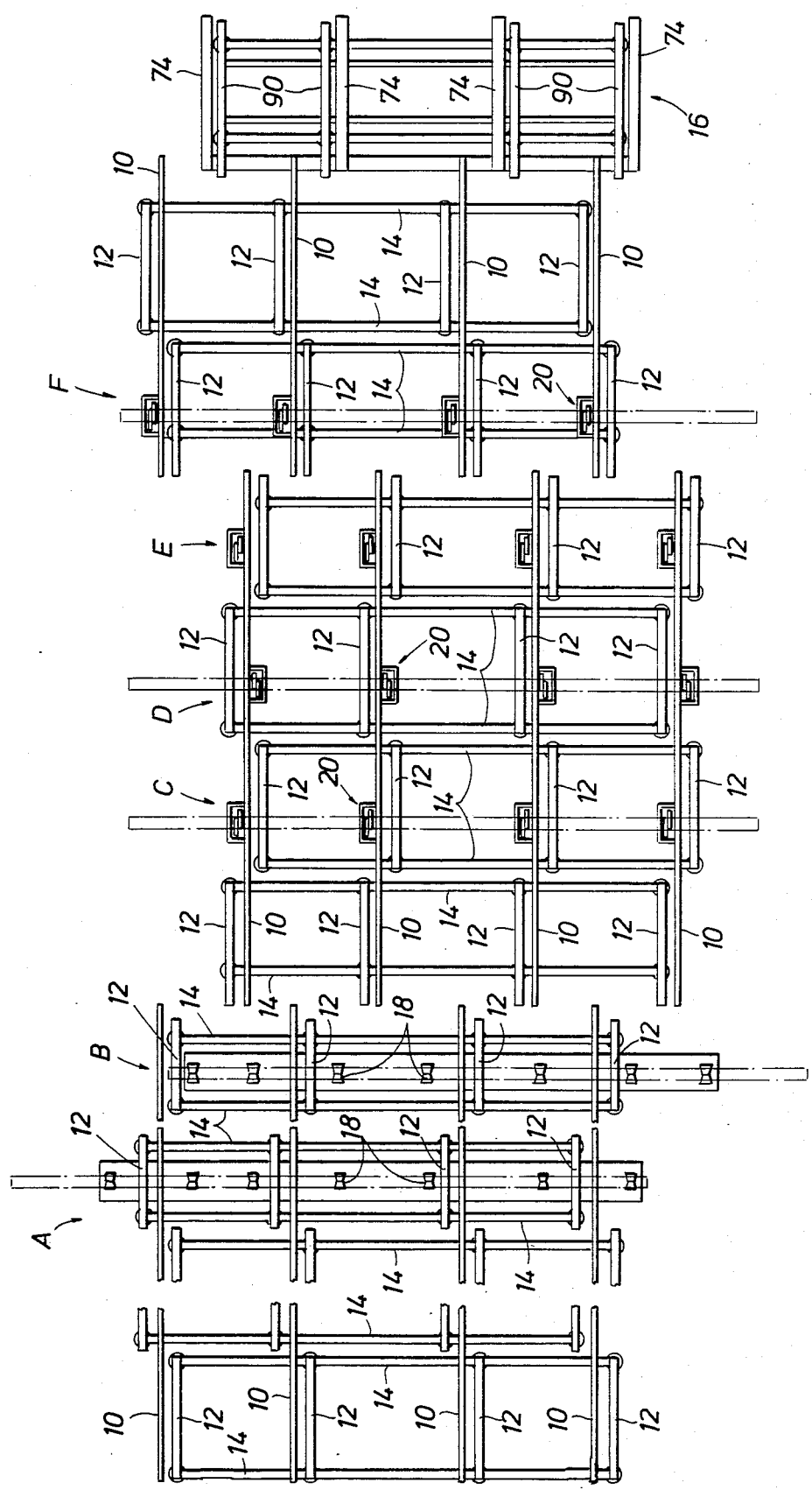
FIG. 1 is a plan view of a portion of the pipe conveying apparatus of this invention arranged to move pipe through six work stations and to a pipe storage rack.

In FIG. 1, the portion of the apparatus used to move pipe through the last six stations of a coating or inspection plant or the like, is shown in a plan view. The fixed rails, although not continuous, are indicated by the number 10. The movable rails are relatively short in length and are arranged on alternate sides of the fixed rails so that their ends can overlap if required or at least be positioned so their ends are in substantially the same vertical plane. These movable rails are indicated generally by the number 12. For lateral stability, the ends of movable rails 12 are supported on transverse beams 14 that extend below fixed beams 10. At the far right hand end in FIG. 1 is the pipe stacker assembly, indicated generally by the number 16.

As stated above, six work stations are shown in FIG. 1. At stations A and B, the pipe is moved longitudinally by tapered rollers 18. At station A, the rollers move the pipe longitudinally in one direction and at station B they move the pipe in the opposite direction. This moves opposite ends of the pipe into position for whatever operation is to be done, such as removing thread protectors. At stations C, D, E, and F, the pipe is rotated by a set of four pairs of idle wheels at each station. The idler wheels are indicated generally by the number 20. One or more of the tapered rollers and idler wheels are powered in the conventional manner to produce the axial movement and rotation desired.

Figure 2:
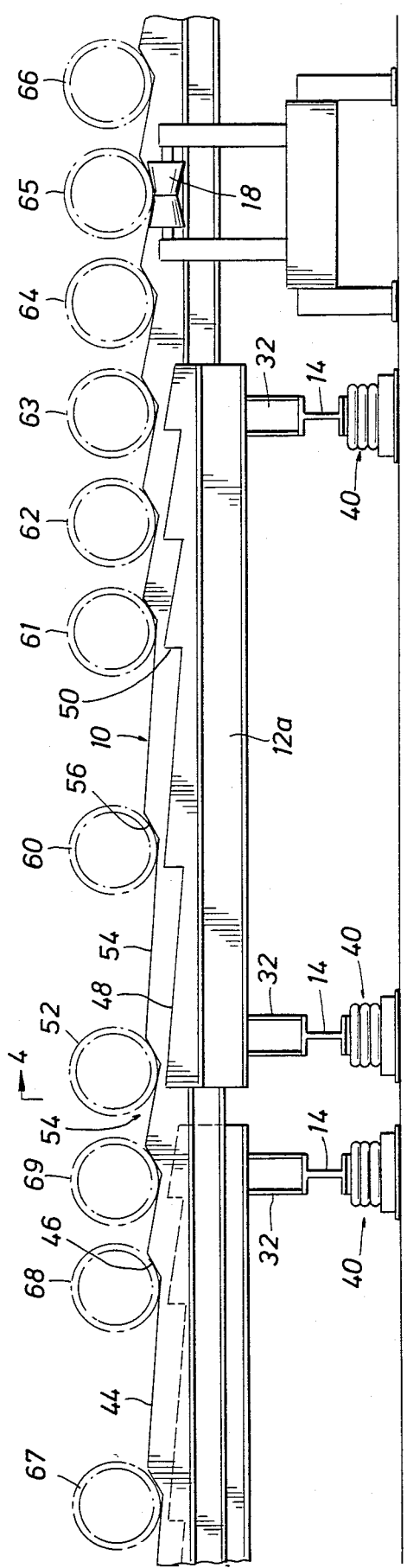
FIG. 2 is a side view, on an enlarged scale, of a portion of the pipe conveying apparatus of FIG. 1 including one work station.
Figure 3:
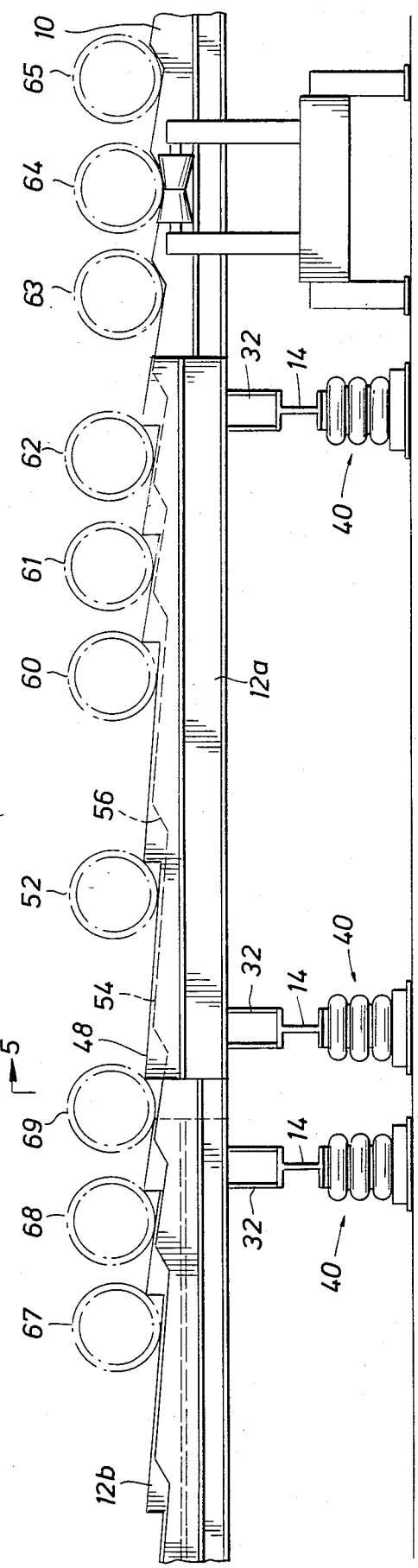
FIG. 3 is a view of the apparatus of FIG. 2 with the pipe being moved one step along its way through the plant.
Figure 4:
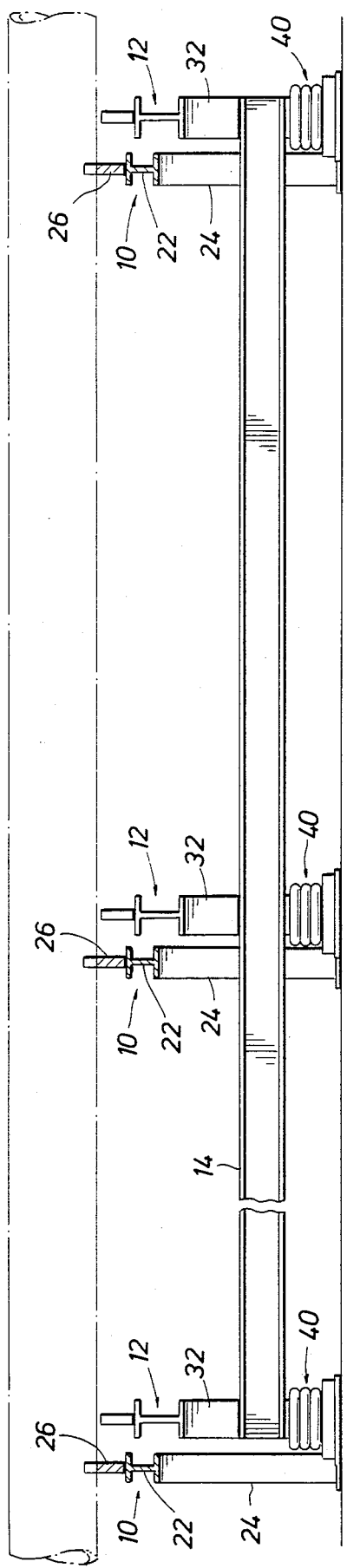
FIG. 4 is a view taken along line 4—4 of FIG. 2.
Figure 5:
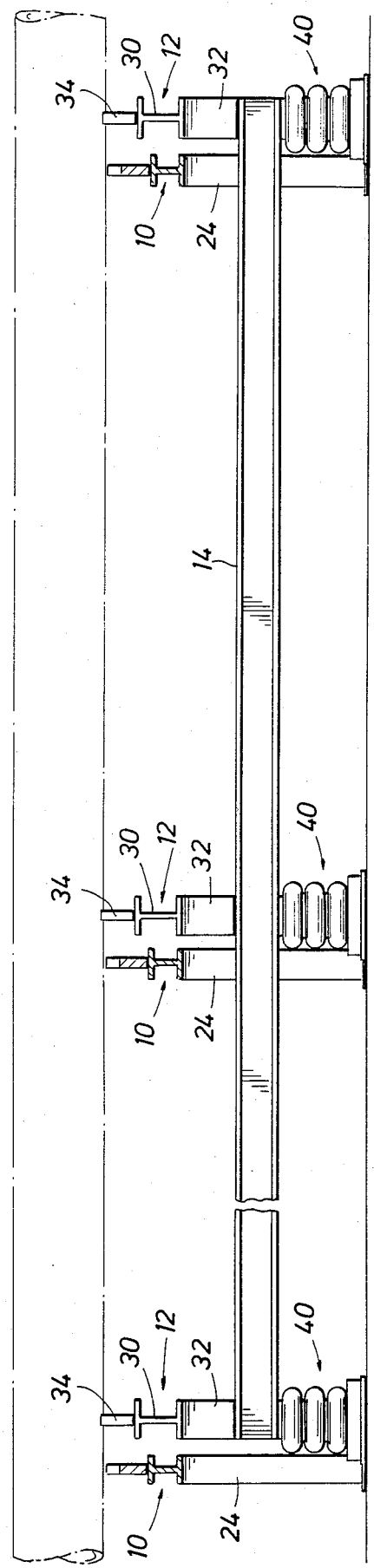
FIG. 5 is a view taken along line 5—5 of FIG. 3.
Figure 8:
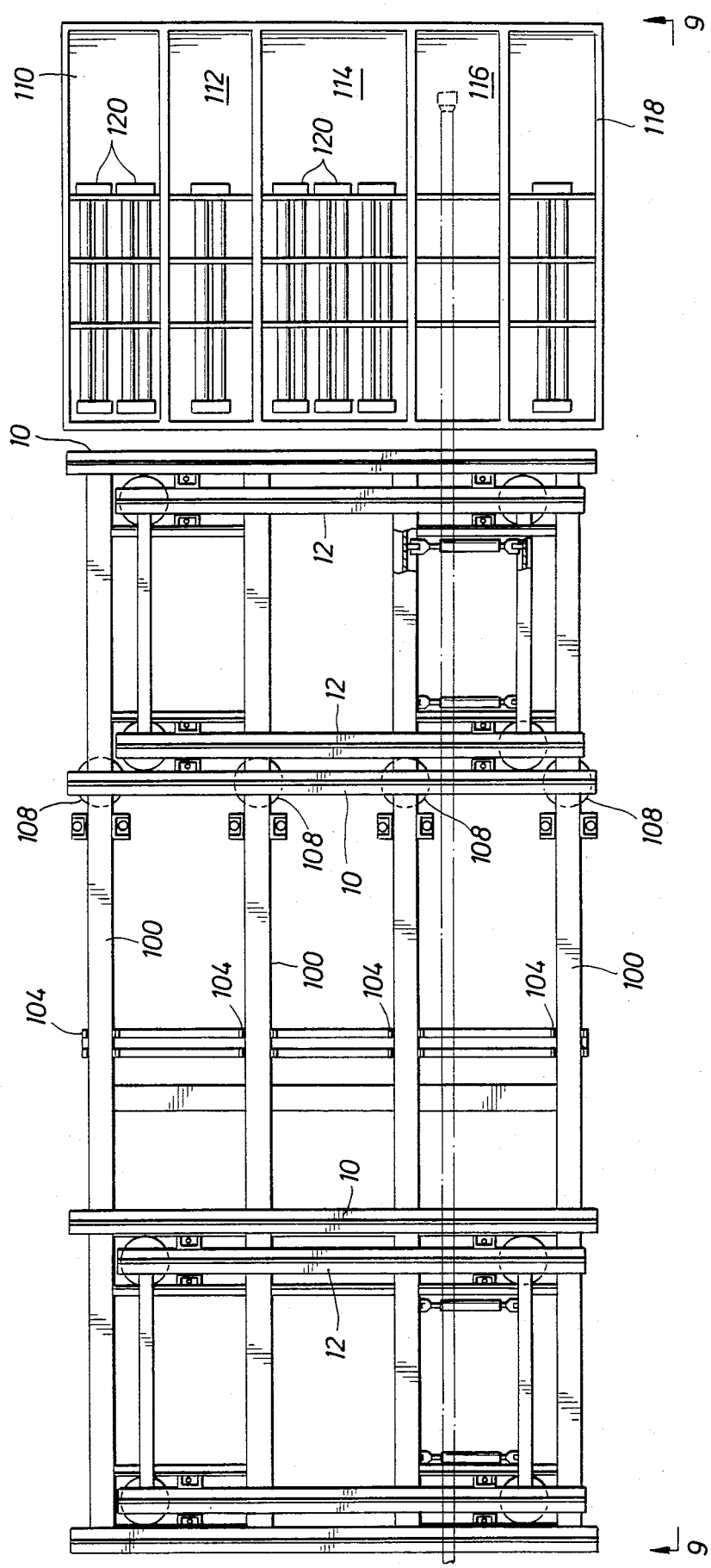
FIG. 8 is a plan view of the section of the conveyor that dips the ends of the pipe in chemical baths located along side the conveyor.

FIGS. 2 and 3 are side views in elevation on an enlarged scale of portions of the pipe conveying apparatus of FIG. 1 and FIGS. 4 and 5 are sections taken through FIGS. 2 and 3, respectively. In FIGS. 2 and 3, one fixed rail 10 and two movable rails 12 are shown. The latter are indicated by the numbers 12a and 12b. As shown in FIGS. 4 and 5 fixed rails 10 include H-beams 22 supported by tubular columns 24. Attached to the top of H-beams 22 are plates 26 that are provided with a plurality of adjacent notches along their upper edges. Movable beams 12 include H-beams 30, which are supported above cross beams 14 by spacers 32. Plates 34 are attached to the top of H-beams 30 of the movable rails and have their upper edges notched, as shown in FIGS. 2 and 3.

Means are provided to move the movable rails to a raised position, shown in FIG. 5, where the movable rails are supporting the pipe and a lower position, shown in FIG. 4, where the fixed rails are supporting the pipe. To move the movable rails between their raised and lowered positions, cross beams 14 are supported by three lobed, flexible walled, air cylinders 40 that expand, as shown in FIG. 5, to raise beams 14 and movable rails 12, when supplied with air under pressure. When the air pressure is removed, the weight of the movable rails and beams 14 is sufficient to collapse the air cylinders to the position shown in FIG. 4.

As stated above, the upper surfaces of fixed rails 10 are provided with notches. The notches on each fixed rail are identical and arranged in rows extending transversely in the direction of the longitudinal axis of the pipe so that each joint of pipe will engage two or more aligned notches when supported by the fixed rails. The notches on the movable rails are arranged in rows in the same manner. So when reference is made to one notch on one of the rails shown in FIGS. 2 and 3, it is to be understood that whatever is said about that notch will be true of the aligned notches on the rails parallel to the rail shown.

Each notch on fixed rail 10, as shown in FIG. 2, has a gently sloping side 44 on the upstream side. Downstream side 46 extends upwardly at an angle sufficient to stop a joint of pipe as it rolls down sloping side 44 to the bottom of the notch. By changing the angle that upstream side 44 makes with the horizontal, the horizontal distance the pipe is moved from one row of notches to an adjacent row of notches can be varied. For example, the notches on the right hand side of fixed rail 10 in FIG. 2 move the pipe joints relatively short lateral distances, whereas the two notches in the middle and the one on the left hand end move the pipe relatively long distances from notch to notch.

The notches on movable rails 12 are designed to complement the notches on fixed rails 10 and are also arranged in rows to support a pipe joint. For example, the first two notches on movable rail 12a have a relatively long gently sloping upstream surface 48, similar to gently sloping side 54 of the adjacent notches on the fixed rails. Downstream sides 50 of the notches, however, have a much steeper angle than the upstream sides 56 of the notches on the fixed rails. This is preferred because most of the movement of the pipe will be down the sloping upstream sides of the notches on the movable rails and it is desirable to have a positive stop formed by the downstream side of the notch to make sure the pipe does not jump over the downstream side into the next notch.

The rows of notches are out of phase so that one movement up and down of the movable rails will move the pipe joints resting in a row of notches on the fixed rails to the next adjacent row of notches. For example, pipe 52 is resting in the bottom of notch 54 on the fixed rail in FIG. 2. When movable rail 12a is moved upwardly, as shown in FIG. 3, to its raised position, the outer upper end of sloping upstream surface 48 will lift pipe 52 upwardly, where it will roll down side 48 and be stopped by downstream side 50 of the notch. As movable rail 12a is returned to the lowered position of FIG. 2, pipe 52 will be transferred to the upstream sloping side 54 of the next notch in the upper surface of fixed rail 10 from where it will roll down into engagement with downstream side 56 of that notch.

The movement of movable rail 12a and the movable rails parallel thereto to their upper raised positions and then back to their lowered position will also move pipe joints 60, 61, 62, 63, 64, 65, and 66 one row of notches further to the right along fixed rails 10. Pipe 65 is moved from its position on tapered rollers 18 and is replaced on the rollers by pipe 64. Pipe 64 is then moved axially by tapered rollers into position for one end to have some operation performed thereon.

Movable rail 12b, along with its companion rails will move joints 67, 68, and 69 to their next adjacent row of notches on fixed rails 10, as shown in FIG. 3. This doesn't have to be done at the same time that movable rail 12a and its companion rails are moved although it usually is.

As explained above, the downstream side of the notches on the movable rails are preferably substantially perpendicular to the longitudinal axis of the rails. This is to provide a more positive stop for the pipe rolling down the downwardly sloping upstream side of the notches where most of the travel of the pipe occurs. For as seen in FIG. 3, when movable pipe rail 12a is returned to its lowered position, it will deposit pipe 52 for example, fairly close to upstream side 56 of the notch formed by sides 54 and 56. Also preferably, the downstream sides of the notches on fixed rail 10 are preferably inclined at approximately 45° to provide sufficient upward slope to stop the downwardly rolling pipe when it reaches the bottom of the notch, but to also make it easier for the movable rail to roll the pipe out of the notch onto the downwardly sloping surface of the notch on the movable rail and reduce any tendency of the pipe to fall backwards off of the downwardly sloping surface of the movable rail.

The diameter of the pipe shown in FIGS. 2 and 3 is such that only one can be accommodated per notch. For smaller diameter pipe, this would not be the case and if desired two or three joints may be located in each notch along the fixed rail and only the joint in the bottom of the notch would be moved to the next adjacent notch upon an upward and downward movement of the movable rails. This arrangement will allow substantially more joints of pipe to be moving through the plant at one time, when the diameter of the pipe is small.

The height of the fixed rails is selected for the convenience of the operations to be performed on the pipe as it is moved through the plant by the pipe conveying apparatus. When the pipe reaches the end of the conveyor, it is usually transferred to a pipe storage rack where it remains until it is shipped to the job where it is to be used. To save space, the pipe storage racks are relatively low to the ground and it is the practice to stack the pipe three to four rows deep on the pipe storage rack. It is a feature of this invention to provide pipe stacking apparatus at the end of the pipe conveying apparatus that will transfer the pipe from the conveying apparatus to the pipe storage rack at variable heights above the ground. This avoids the damage that can occur to the pipe when, as in the past, it is rolled down a long inclined surface to the rack where it picks up momentum and is abruptly stopped when it strikes the pipe already on the rack.

Pipe stacker assembly 16 of this invention is shown in FIG. 6 delivering pipe directly to the surface of pipe storage rack 70 where it will roll gently down the horizontal surface of the storage rack to the desired position. In FIG. 7, the pipe stacker assembly is delivering pipe to the fourth layer of pipe to be placed on the pipe storage rack, again allowing the pipe to be gently moved onto stringers 72 that are supporting the fourth layer of pipe on the rack.

The pipe stacker includes a plurality of pivoted rails 74 that are in spaced, parallel, position relative to each other and to fixed rails 10 of the pipe conveying apparatus. Means are provided for supporting one end of the pivoted rails for pivotal movement around an axis adjacent to the ends of the fixed rails of the conveying assembly.

In the embodiment shown, pivoted rails 74 are attached to vertical support column 76 for rotation about the axis of pivot pin 78. Means are provided to adjust the angle the pivoted rails make with the horizontal to locate the outer ends of the pivoted rails at the desired height above the ground. In the embodiment shown, screw jack 80, which is manually operated, is attached to one end of base beam 82 by pivot pin 83. The movable portion of jack 84 is connected to pivoted beam 74 by pin 85. By manually operating screw jack 80, the pivoted beam and all that is attached to it can be adjusted to discharge the pipe at the desired level onto the pipe storage rack.

The upper surfaces of pivoted rails 74 are provided with adjacent notches along its length, which are arranged in rows to support a pipe joint. Each notch has a rather gently sloping upstream surface 87 and a substantially vertical downstream side 88. Only half a notch is present at the outer ends since the pipe is discharged from the rails at this point. At the end of the pivoted rails adjacent the fixed rails of the pipe conveying apparatus, where the pipe is transferred from fixed rails 10 onto the pipe stacker, surface 89 is rounded or curved to assist the movable rails attached to the pivoted rails, as will be described below, to move the pipe from fixed rails 10 onto the pivoted rails of the pipe stacker. Curved surfaces 89 on the pivoted rails also act as stops to position the pipe on fixed rails 10 for movement onto the pivoted rails of the pipe stacker.

Movable rails 90 are attached to and supported by pivoted rails 74. Channels 91 extend below pivoted rails 74 and are attached to the bottoms thereof adjacent opposite ends of the rails. Expandable air cylinders 92 are positioned in the channels below each of the four movable rails. Preferably, each movable rail is located fairly close to one of the pivoted rails, as shown in FIG. 1.

Adjacent the air assemblies that are close to the pivoted end of the pivoted rails are guide beams 93, which are attached to movable rails 90 and extend downwardly along opposite sides of channel 91.

The movable rails are also provided with notches on their upper surfaces, which are arranged in rows to support a pipe joint. These notches are substantially the same shape as the notches on pivoted rails 74, each having inclined surface 94 on the upstream side and a substantially vertical side 95 on the downstream side. Side 95 basically lies in a plane perpendicular to the longitudinal axis of the movable rails.

As before with movable rails 12 and fixed rails 10 of the conveying system, the notches on the pivoted and movable rails are out of phase so that upward movement of movable rails 90 will lift a pipe joint out of a row of notches on pivoted rails 74 and when the movable rails are returned to their lowered position as shown in FIG. 6, the pipe will be advanced one row of notches along pivoted rails 74. In this manner, by moving movable rails 90 up and down relative to the pivoted rails, the pipe will move step-by-step along the length of pivoted rails 74 until the pipe is discharged at the proper height onto pipe rack 70.

Attached to the bottom of each pivoted rail is stop 96, which has a surface designed to engage beams 97 of the base of the pipe stacker, when pivoted rails 74 are in their lowermost position, as shown in FIG. 6.

Threaded tie rods 98 are located on opposite sides of air cylinders 92. One end of each tie rod is connected to channel 91 and the other end is provided with nuts 99, which engage a plate attached to a movable rail 90 to limit the upward movement of the rail relative to channel 91. This is done to prevent damage to the air cylinders should they be over inflated.

FIGS. 8–12 show a section of the conveyor system designed to dip the ends of the pipe in a series of tanks containing chemicals to inhibit the formation of rust on newly machined surfaces. One such treatment is called Parkerizing and involves dipping the ends of the pipe in a phosphate solution. This section of the conveyor includes fixed rails 10 and movable rails 12 that move the pipe along in the manner described above by moving the movable rails up and down to move the pipe notch by notch along the fixed rails. In this section, fixed rails 10 are mounted on elongated support beams 100. Also, mounted on support beam 100 are air cylinders 102 that move beams 12 relative to the fixed beams.

Figure 9:
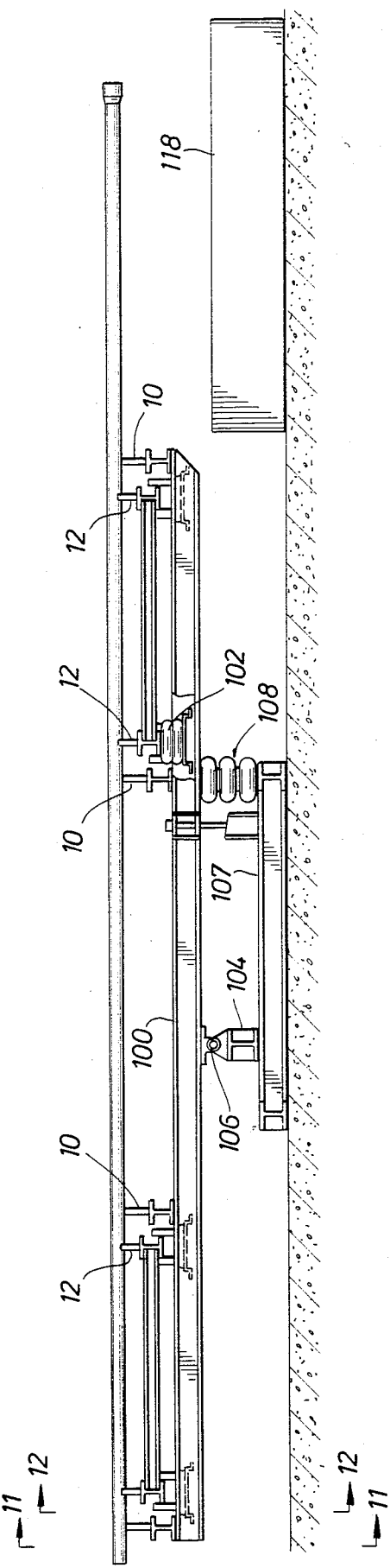
FIG. 9 is a view of the section of FIG. 8 looking in the direction of arrows 9—9 with the section supporting the pipe in a horizontal position.
Figure 10:
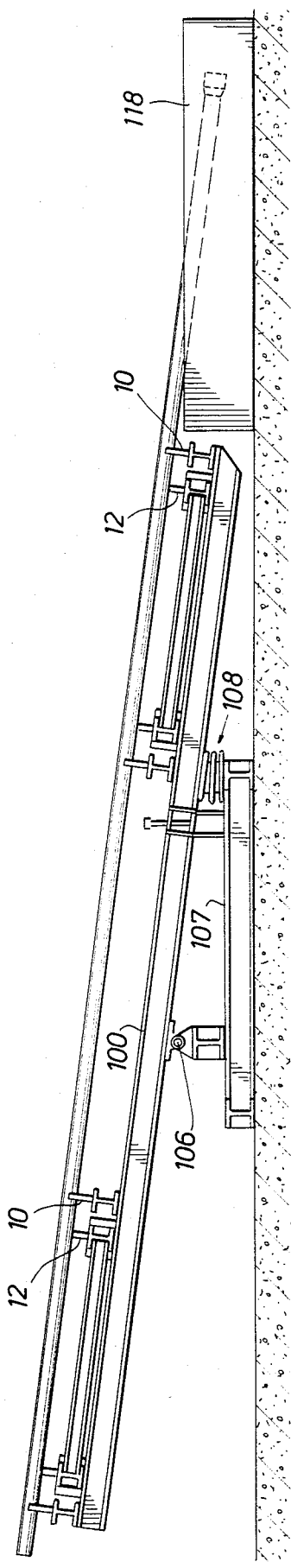
FIG. 10 is a view similar to FIG. 9 with the section pivoted to dip the ends of the pipe into the chemical tanks.

Means are provided to mount support beam 100 for pivotal movement around an axis extending in the direction of movement of the pipe to move the pipe from a horizontal position as shown in FIG. 9 to an inclined position shown in FIG. 10 with the end of the pipe immersed in the chemical tanks located along side this section of the conveyor. In this embodiment, each support beam 100 is connected to pillow blocks 104 by shafts 106 for pivotal movement around the longitudinal axis of shafts 106. Spaced from pillow blocks 104 and supported by base 106 directly below support beams 100 are a plurality of air cylinders 108. Thus, the entire weight of this section of the conveyor system is supported on pillow blocks 104 and air cylinders 108. The distance between the pivotal blocks and the air cylinders is such that when the air cylinders are collapsed as shown in FIG. 10, the ends of the pipe will be immersed completely in the chemical baths contained in the tanks positioned along side the conveyor.

The tanks in the embodiment shown, as well as the notches on the moving and fixed rails, are designed to treat the ends of the pipe with the "Parkerizing" process to inhibit rust formation by coating the surface with a phosphate layer by dipping the ends of the pipe in an acid phosphate solution. The first stop for the pipe is tank 110, which contains a caustic solution to clean the ends of the pipe of dirt, grease and the like. From the caustic wash tank, the pipe is moved into rinse tank 112 to wash off the caustic before being immersed in the acid phosphate solution in tank 114. Next is another rinse tank 116 followed by tank 118 which contains a detergent solution. The solution in all of the tanks except wash tank 116 is heated by internal heaters 120 located adjacent the bottom of the tanks.

Figure 11:
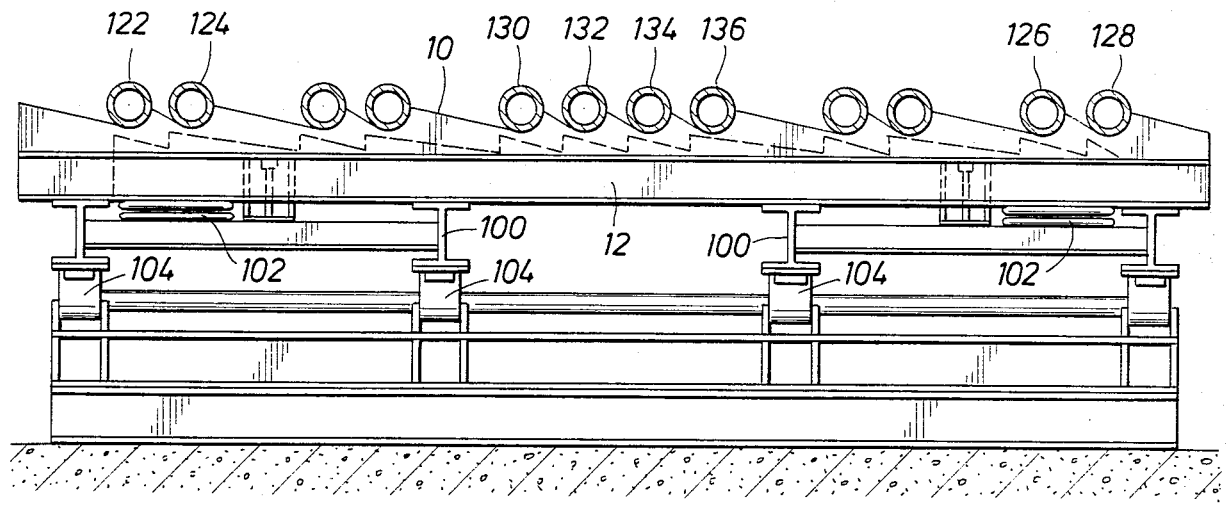
FIG. 11 and FIG. 12 are views looking toward the ends of the pipe to show the arrangement of the notches on the rails of this section of the conveyor that cause the ends of the pipe to be dipped the required number of times in each tank as the pipe moves through this section of the conveyor.
Figure 12:
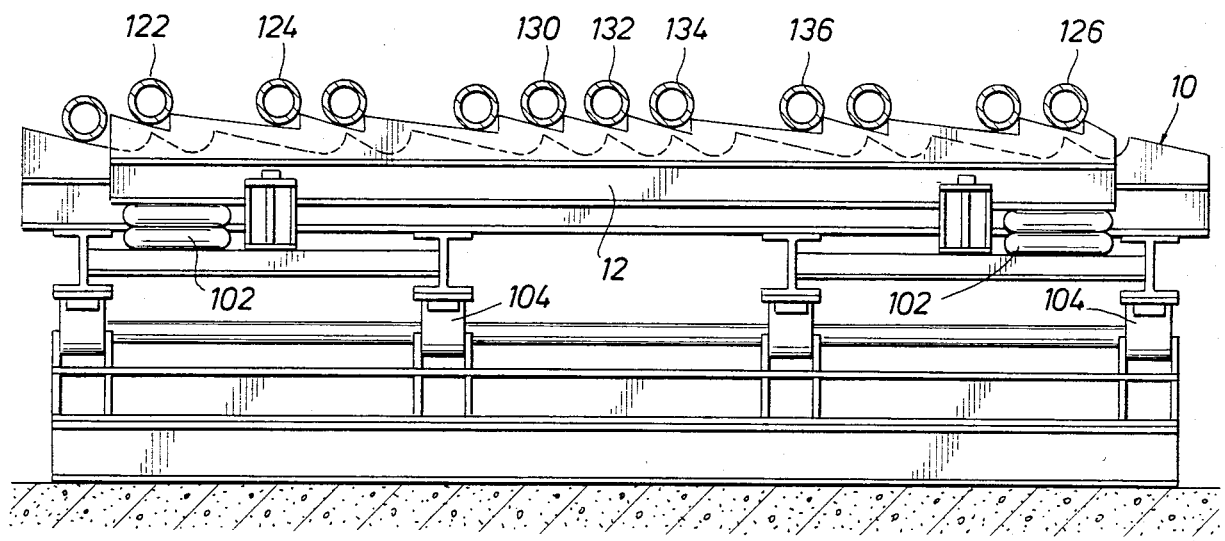

The process requires that the ends of the pipe remain in the phosphate solution twice as long as the pipe is in the other solutions used. The notches in the pipe rails of the conveyor system are designed to accomplish this, as shown in FIGS. 11 and 12. These views are looking from the side of the conveyor facing the treating tanks so the pipe is moving from left to right. Pipe joints 122 and 124 are positioned in FIG. 11 for immersion in caustic tank 110 while pipe joints 126 and 128 are being immersed in the detergent tank. Since the pipe has to stay in the phosphate twice as long as the other tanks, the notches are arranged so that four joints are treated with the phosphate each time the pipe conveying system is tilted downwardly in the manner described above. The notches on movable rail 12 are designed to move the pipe one notch at a time thus each joint will be in a position to be dipped into the phosphate tank four times, but it is dipped in the other tanks just two times as it travels from one end of the section to the other. This is shown in FIG. 12 where removable rail 12 has picked up the pipe from the notches in the fixed rail. When it returns to its second position, all of the pipe will move up one notch.

Pipe 124 will move into position to be moved into the first rinse tank. Pipe 136 will be moved so that it will be immersed in the second rinse tank. Pipe joint 128 will have moved from this section of the conveyor apparatus having finished it treatment.

Two tilting sections are usually provided so both ends of the pipe will be treated.

From the foregoing, it will be seen that this invention is one well adapted to attain all of the ends and objects hereinabove set forth, together with other advantages which are obvious and which are inherent to the apparatus.

It will be understood that certain features and subcombinations are of utility and may be employed without references to other features and subcombinations. This is contemplated by and is within the scope of the claims.

Because other embodiments may be made of the invention without departing from the scope thereof, it is to be understood that all matter herein set forth or shown in the accompanying drawings is to be interpreted as illustrative and not in a limiting sense.

I claim:

1. Pipe conveying apparatus comprising a plurality of spaced, parallel, fixed pipe rails for supporting a plurality of joints of pipe extending transverse the rails, a plurality of spaced movable pipe rails that are parallel to each other and to the fixed pipe rails, means for moving the movable rails between a raised position where the pipe joints above the movable rails are supported by the movable rails and a lowered position where the pipe joints are supported by the fixed rails, said fixed and movable rails having adjacent notches on their upper surfaces, said notches being arranged in transversely aligned rows to support one or more pipe joints in each row of notches, each notch having an upstream side that slopes gently downwardly in the direction the pipe is to be moved so that pipe supported thereon will roll by gravity down the sloping side toward the bottom of the notch and a downstream side extending upwardly to stop the movement of the pipe when it reaches the bottom of the notch, said notches on the movable rail being positioned so that when the movable rails are moved to their raised position the gently sloping upstream sides of the notches on the movable rails will lift the pipe resting in the bottom of the notches on the fixed rails above the downstream sides of the notches on the fixed rails where the pipe will roll down the gently sloping upstream sides of the notches on the movable rails until stopped by the downstream sides of the notches so that when the movable rails are moved to their lowered positions, the pipe will be deposited on the gently sloping upstream sides of the next row of notches on the fixed rails from where the pipe will roll downwardly to the bottom of the next row of notches on the fixed rails so that each pipe joint resting at the bottom of a row of notches on the fixed rails will be moved one row of notches each time the movable rails are moved from their lowered position to their raised position and returned to their lowered position, means mounting a section of the fixed and movable pipe supporting rails for pivotal movement as a unit around an axis parallel to the rails and means for moving the section around its pivotal axis between a first position in which the pipe is substantially horizontal and a second position where one end of each pipe joint supported by the section is lowered into a tank containing a liquid, such as an acid phosphate solution used to inhibit the formation of rust.

2. Pipe conveying apparatus comprising a plurality of spaced, parallel, fixed pipe rails for supporting a plurality of joints of pipe extending transverse the rails, a plurality of spaced movable pipe rails that are parallel to each other and to the fixed pipe rails, means for moving the movable rails between a raised position where the pipe joints above the movable rails are supported by the movable rails and a lowered position where the pipe joints are supported by the fixed rails, said fixed and movable rails having adjacent notches on their upper surfaces, said notches being arranged in transversely aligned rows to support one or more pipe joints in each row of notches, each notch having an upstream side that slopes gently downwardly in the direction the pipe is to be moved so that pipe supported thereon will roll by gravity down the sloping side toward the bottom of the notch and a downstream side extending upwardly to stop the movement of the pipe when it reaches the bottom of the notch, said notches on the movable rail being positioned so that when the movable rails are moved to their raised position the gently sloping upstream sides of the notches on the movable rails will lift the pipe resting in the bottom of the notches on the fixed rails above the downstream sides of the notches on the fixed rails where the pipe will roll down the gently sloping upstream sides of the notches on the movable rails until stopped by the downstream sides of the notches so that when the movable rails are moved to their lowered positions, the pipe will be deposited on the gently sloping upstream sides of the next row of notches on the fixed rails from where the pipe will roll downwardly to the bottom of the next row of notches on the fixed rails so that each pipe joint resting at the bottom of a row of notches on the fixed rails will be moved one row of notches each time the movable rails are moved from their lowered position to their raised position and returned to their lowered position, means for moving pipe from the conveying apparatus to a pipe storage rack comprising a plurality of parallel, pivoted, pipe rails, means supporting one end of the pivoted rails for pivotal movement around an axis adjacent to the ends of the fixed rails, means for adjusting the angle the pivoted rails make with the fixed rails to discharge pipe from the end of the pivoted rails at different heights relative to the height of the fixed rails, a plurality of movable rails parallel to the pivoted rails, means mounting the movable rails for movement with the pivoted rails to retain their parallel relationship as the pivoted rails are moved to different angular positions relative to the fixed rails, and means for moving the movable rails between a raised and a lowered position; said pivoted and movable rails having adjacent notches on their upper surfaces, with the notches on the rails arranged in rows so that each row can support a pipe joint, each notch having an upstream side sloping gently downwardly in the direction the pipe is to be moved so that pipe supported thereon will roll by gravity down the sloping side to the bottom of the notch and a downstream side extending upwardly to stop the movement of the pipe when it reaches the bottom of the notch, said notches on the movable rails being positioned so that when the movable rails are moved to their raised positions, the upstream sides of the notches thereon will lift the pipe resting in the bottom of the notches on the pivoted rails above the upstream side of the notches on the pivoted rails where the pipe will roll downwardly to the bottom of the notches on the movable rails so that when the movable rails are moved to their lowered position, the pipe will be deposited on the upstream side of the next row of notches on the pivoted rails to move the pipe from one row of notches to the next row of notches down the pivoted rails until discharged onto the storage rack.

3. The apparatus of claim 2 which the upstream sides of the notches on the movable rails are substantially perpendicular to the longitudinal axis of the movable rails.

4. The apparatus of claim 3 in which the means for moving the movable rails are air cylinders having curved, flexible, walls.

* * * * *